United States Patent
Stam et al.

(10) Patent No.: US 7,766,620 B2
(45) Date of Patent: Aug. 3, 2010

(54) ROTOR BLADE WITH A LIGHTNING PROTECTION UNIT, WIND ENERGY SYSTEM HAVING THE SAME AND A METHOD FOR CONSTRUCTING A ROTOR BLADE

(75) Inventors: Ronny Stam, Borne (NL); Rainer Arelt, Salzbergen (DE); Andreas Starke, Rheine (DE)

(73) Assignee: General Electricc Company, Schenectady, NY (US)

( * ) Notice: Subject to any disclaimer, the term of this patent is extended or adjusted under 35 U.S.C. 154(b) by 628 days.

(21) Appl. No.: 11/672,534

(22) Filed: Feb. 8, 2007

(65) Prior Publication Data
US 2008/0193292 A1   Aug. 14, 2008

(51) Int. Cl.
*F03D 11/00* (2006.01)
(52) U.S. Cl. .................. 416/146 R; 416/224; 416/230
(58) Field of Classification Search ............ 416/146 R, 416/230, 224
See application file for complete search history.

(56) References Cited

U.S. PATENT DOCUMENTS 6,979,179 B2 * 12/2005 Møller Larsen ......... 416/223 R

| | | | |
|---|---|---|---|
| 2003/0175121 A1 * | 9/2003 | Shibata et al. | 416/131 |
| 2004/0130842 A1 * | 7/2004 | Johansen et al. | 361/117 |
| 2005/0180854 A1 * | 8/2005 | Grabau et al. | 416/241 R |
| 2009/0139739 A1 * | 6/2009 | Hansen | 174/2 |

FOREIGN PATENT DOCUMENTS

| | | |
|---|---|---|
| DE | 4436197 C2 | 9/1998 |
| EP | 1154537 | 11/2001 |
| WO | WO96/07825 * | 3/1996 |
| WO | WO 2005/031158 A2 | 4/2004 |

OTHER PUBLICATIONS

Hau, Erich; Chapter 7 Rotorblatter, Windkraftanlagen; 2nd Ed.; 1996; pp. 1-28; Springer Publishing, Berlin, Germany.

* cited by examiner

*Primary Examiner*—Edward Look
*Assistant Examiner*—Jesse Prager
(74) *Attorney, Agent, or Firm*—Global Patent Operation; Douglas D. Zhang (57) ABSTRACT

A rotor blade for use in a wind energy system is disclosed. The rotor blade includes a rotor blade body comprising a tip; a down conductor extending along the rotor blade body; a conductive part including a conductive part body attached to the rotor blade body and connected to the down conductor, and an extension extending outward from the conductive part body and protruding out of the tip; a lightning receptor having a cavity for slidably receiving the extension; and a fastener removably fastening the lightning receptor to the extension.

15 Claims, 7 Drawing Sheets

ROTOR BLADE WITH A LIGHTNING PROTECTION UNIT, WIND ENERGY SYSTEM HAVING THE SAME AND A METHOD FOR CONSTRUCTING A ROTOR BLADE

FIELD OF THE INVENTION

The present invention relates to a rotor blade with a lightning protection unit, a wind energy system having the same and a method of constructing a rotor blade.

BACKGROUND OF THE INVENTION

Due to the increasing height of wind energy systems, the issue of lightning protection becomes more and more important. As wind energy systems are typically built in regions with no or only a few tall obstacles such as trees, lightning strikes in these areas concentrate mainly on the wind energy systems installed. Thus, in particular the nacelle and the rotor blades of a wind energy system have to be protected from lightning strikes.

BRIEF DESCRIPTION OF THE INVENTION

In view of the above, a rotor blade for use in a wind energy system is provided with the rotor blade having a rotor blade body; a rotor blade body cavity; and a lightning protection unit. The lightning protection unit includes a conductive part that is connected to a down conductor and positioned within the rotor blade body cavity close to or at the rotor blade body tip. The conductive part has an extension protruding out of the rotor blade body. The extension is adapted for receiving a receptor.

The term "extension" of the conductive part refers to the part of the conductive part that protrudes out of the rotor blade body cavity. In typical embodiments, the conductive part body and the conductive part extension are integrally formed. The position of the conductive part is "close to" the rotor blade body tip if the conductive part is positioned such that the extension of the conductive part extends out of the rotor blade body at the rotor blade body tip.

Hence, the invention allows for the receptor to be easily attached to the down conductor and to be easily removed again.

According to another aspect of the invention, a wind energy system is provided with at least one of such a rotor blade.

According to another aspect of the invention, a method for constructing a rotor blade for use in a wind energy system is provided with the steps of
- manufacturing a pressure side shell and a suction side shell of the rotor blade;
- applying a conductive part to an inner side of the pressure side shell or the suction side shell with the conductive part including a body and an extension; and
- forming the rotor blade by joining the pressure side and the suction side shell together in such a way that the body of the conductive part is within the rotor blade and the extension of the conductive part protrudes out of the rotor blade.

The term "applying" embraces all techniques for connecting the conductive part to the respective rotor blade side shell such as mounting, fixing, attaching, gluing etc.

In typical embodiments, the rotor blade body is made of a composite material. However, the receptor is typically made of a conductive material such as aluminium, stainless steel, or copper. Once the receptor is attached to the rotor blade body it becomes the tip of the rotor blade. That is, once a receptor is mounted to the extension of the conductive part, the extension is typically covered by the receptor.

In a typical production of the rotor blade body of the present invention, a standard length rotor blade is manufactured, and the very tip is cut off with the length of this part, that is cut off, corresponding to the receptors that may be mounted to the rotor blade body tip. Another possibility is that the rotor blade body casting mold comprises a dummy at the very tip of it in order to reduce the length of the rotor blades cast at a length that corresponds to the receptors which are supposed to be attached to the rotor blade body. Alternatively, it is possible to manufacture a rotor blade body with the correct length directly. Typically, the receptor's shape corresponds to that part of the rotor blade body that has been omitted in the manufacturing of the rotor blade. That is to say, the receptor's shape is typically an elongation of the rotor blade body tip's shape.

Further aspects, advantages and features of the present invention are apparent from the dependent claims, the description and the accompanying drawings.

BRIEF DESCRIPTION OF THE DRAWINGS

A full and enabling disclosure of the present invention, including the best mode thereof, to one of ordinary skill in the art, is set forth more specifically in the remainder of the specification, including reference to the accompanying figures wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used in conjunction with other embodiments to yield yet a further embodiment. It is intended that the present invention includes such modifications and variations.

Figure 1:
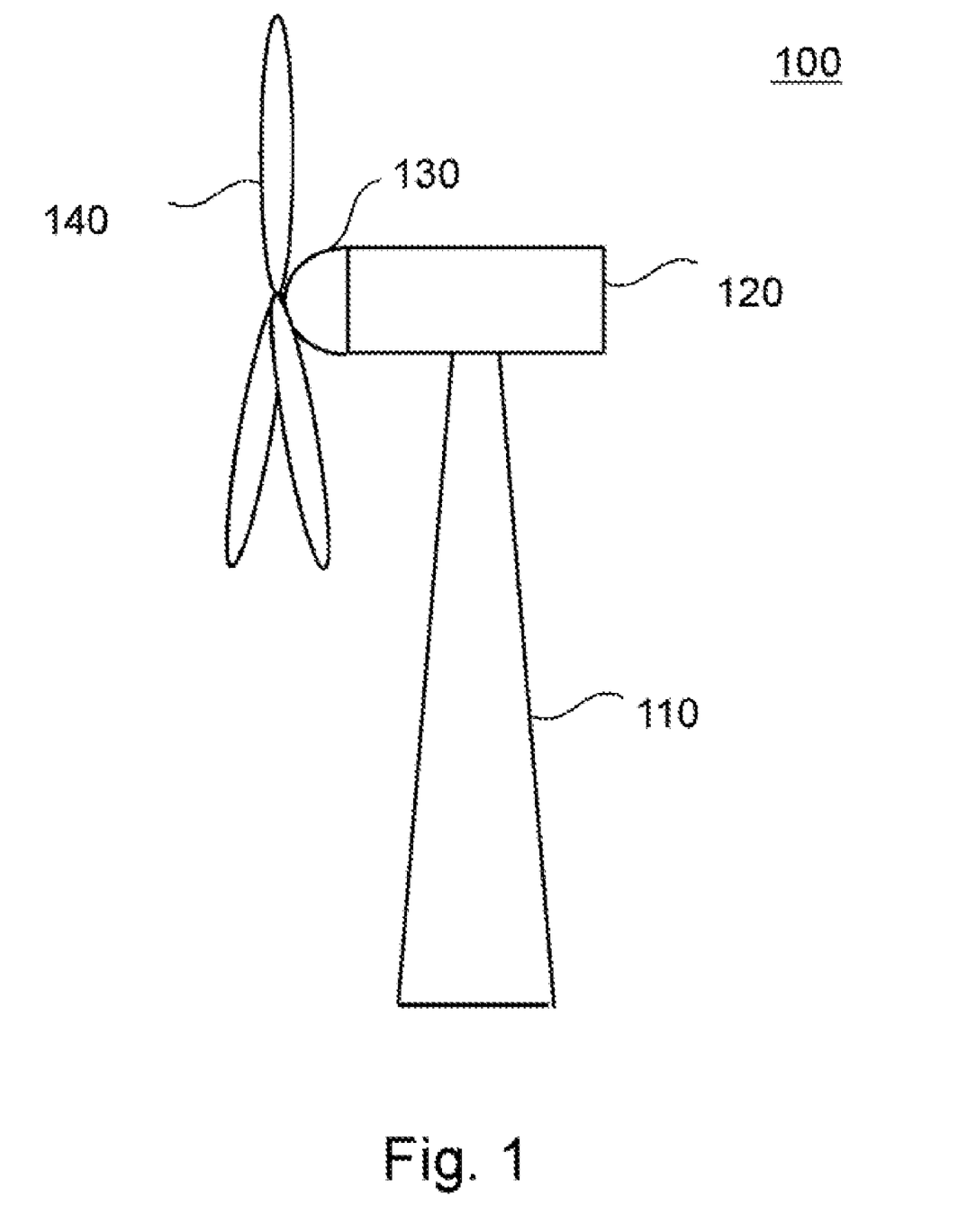
FIG. 1 is a schematic view of a wind turbine having three rotor blades according to the present invention.

FIG. 1 is a schematic view of a wind turbine. The wind turbine 100 includes a tower 110 to which a machine nacelle 120 is mounted at its top end. The nacelle houses a drive train to which a main electric generator is connected (not shown). A hub 130 bearing three rotor blades 140 is mounted to a lateral end of the machine nacelle 120. The rotor blades 140 can be adjusted by pitch drives which are typically accommodated inside hub 130.

According to the present invention, the rotor blades are equipped with a lightning protection system. If a lightning strikes the rotor blade, it should strike the specially arranged lightning receptors on the rotor blades. From there, the high electric charge is typically transported via a down conductor to the rotor blade root which is connected to ground e.g. by being connected to the bearing (not shown). The electric charge of a lightning strike is then led away via the wind energy system tower to the ground.

Figure 2:
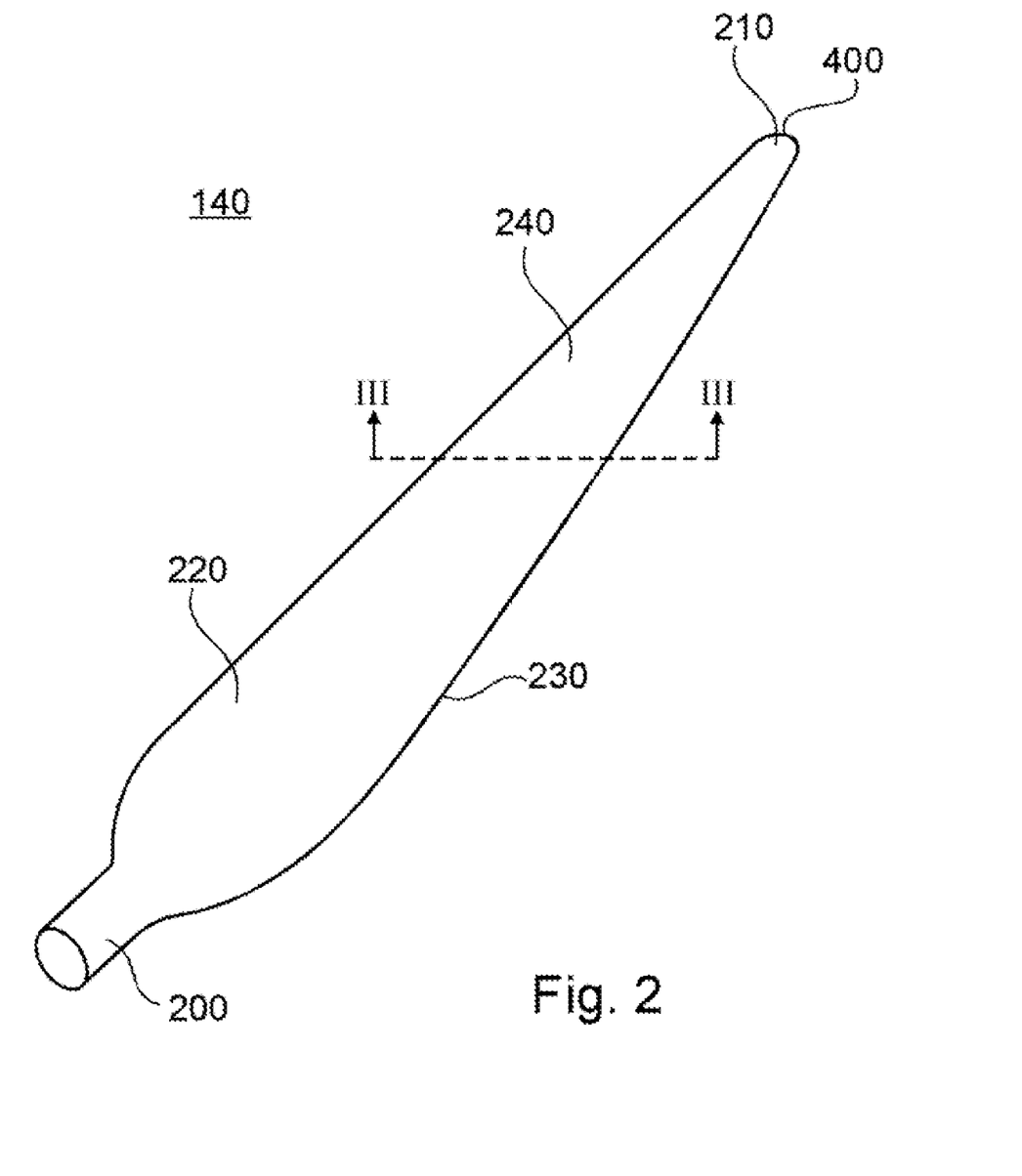
FIG. 2 is a schematic view of a rotor blade according to the present invention.

FIG. 2 is a schematic view of a rotor blade for use in a wind energy system. The rotor blade 140 comprises the rotor blade body 240 with its rotor blade body tip 210, and the rotor blade root 200. The rotor blade root 200 is typically mounted to the wind energy system hub 130. The rotor blade body tip 210 is positioned at the opposite end of the rotor blade 140. Typically, the rotor blade comprises two shells: the pressure side shell, which is also called concave shell, and the suction side shell, which is also called convex shell of the blade. The shell 220 shown in FIG. 2 refers to the suction side shell, whereas the lower side of the rotor blade in FIG. 2 is the pressure side shell 230. In other embodiments of the present invention, the rotor blade comprises several parts. Typically, the shells are made of composite material such as glass or carbon fibre, e.g. reinforced epoxy, polyester, or vinylester resin. In various embodiments, the cavity of the rotor blade comprises balsa wood or plastic foam. Due to the perspective and scale chosen in FIG. 2, the conductive part 400 is not visible in detail but will be explained in more detail below.

Figure 3:
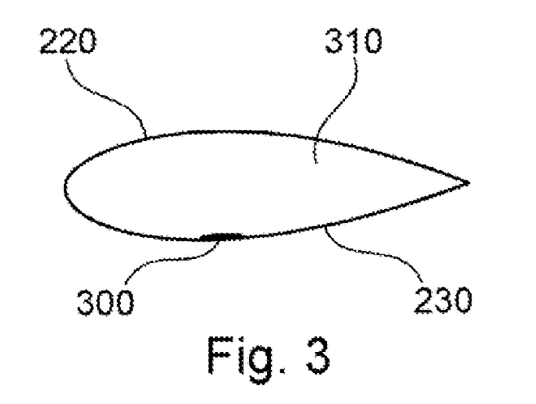
FIG. 3 is a cross sectional view of a rotor blade according to the present invention.

FIG. 3 is a schematic view of the cross section of the rotor blade body 140 shown in FIG. 2 at that position in FIG. 2 where the dotted lines are depicted. FIG. 3 shows the suction side shell 220, the pressure side shell 230, and the down conductor 300. In the embodiment shown, the down conductor is mounted to the pressure side shell 230. In general, the down conductor may be positioned on the suction side shell, somewhere within the rotor blade body cavity formed by suction side shell and pressure side shell, or on the pressure side shell. The cavity 310 formed of the two shells may be hollow, partly filled or completely filled with a filling material. In the latter case, material with a small weight such as foam, in particular polyurethane foam, some kind of glue or adhesive, or resin may be employed. This is mainly for stability reasons. Further equipment can be arranged between the two shells 220 and 230 such as a rib for stiffening the rotor blade against wind pressure caused torsions and bendings (see embodiment of FIG. 8) and so on.

Figure 4:
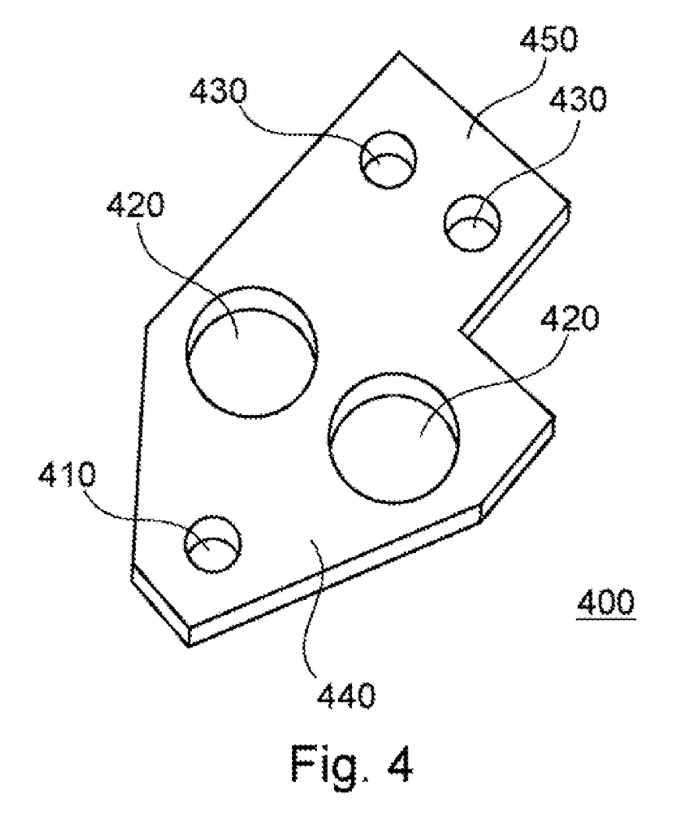
FIG. 4 is a schematic view of a conductive part according to the present invention.

FIG. 4 shows an embodiment of the conductive part according to the present invention. The conductive part 400 comprises a body 440 and an extension 450. Typically, the conductive part is made of metal such as aluminium or some metal alloy. The conductive part comprises a drilling 410 for attaching the conductive part to the down conductor via connection and fixing means such as a screw, a bolt, a pin, or the like. Various other connection techniques are also employable such as the provision of several drillings or the like. In the embodiment shown in FIG. 4, the conductive part also comprises holes 420. These holes are typically filled with a fixation filling such as glue, foam or resin during manufacture of the rotor blade according to the present invention. This technique provides for a form-closed fixation of the conductive part without reducing the stability or conduction properties of the conductive part. Depending on the application, a conductive part according to the present invention may comprise 0, 1, 2 or more of such holes. The shape of the holes may be round, ellipsoid, rectangular, combinations thereof or the like. For instance, the hole 420 is ellipsoid in FIG. 8. In addition, the extension 450 of the conductive part 400 comprises two drillings 430 for receiving fixing means for mounting the receptor. In other embodiments (not shown in the drawings), the extension may have only one, three or even more drillings for receiving fixing means. Of course, the receptor to be attached has to be provided with a respective number of drillings. This will be discussed in more detail with respect to the following figures.

It shall be mentioned that the conductive part according to the present invention may have an arbitrary shape as long as it can be securely fixed within the rotor blade body and allows a secure fit of the receptor on the conductive part's extension. In particular, the width of the extension can also be larger or equal to the width of the body. The extension may have a rectangular or substantially rectangular shape.

Figure 5:
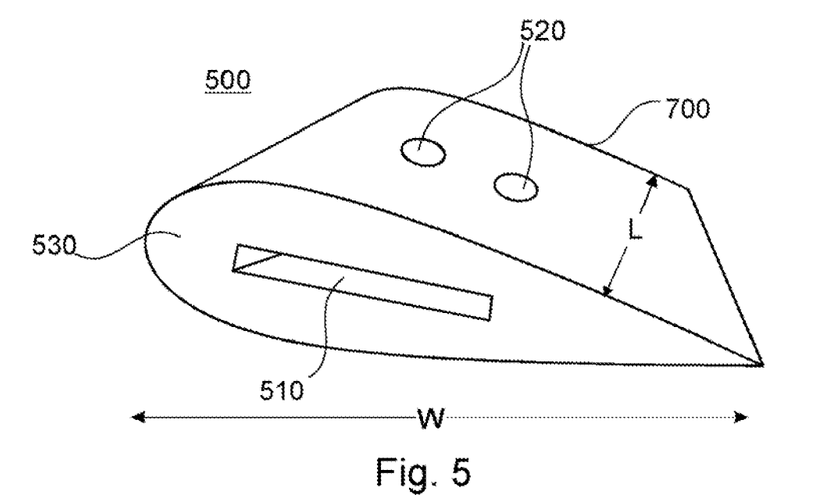
FIG. 5 is a schematic view of a receptor according to the present invention.

FIG. 5 shows an embodiment of a receptor according to the present invention. Typically, the receptor is made of solid metal such as aluminium, stainless steel, copper, or an alloy thereof. In typical embodiments, the receptor is a one-piece assembly. The receptor according to the present invention may also be coated as long the coating does not substantially reduce the conductivity between the receptor and the surrounding. Typically, the length L of the receptor is between 10 mm and 70 mm, more typically between 30 mm and 40 mm. The width W of the receptor is typically between 100 mm and 300 mm, more typically between 120 mm and 200 mm. In many embodiments of the present invention, the receptor is shaped such that the width W of the receptor 500 is greater at the rotor blade oriented side 530 of the receptor than at the opposite side 700 of the receptor. The rotor blade oriented side 530 of the receptor 500 is the side that will be in contact with the rotor blade after mounting the receptor to the conductive part. In order to mount the receptor to the conductive part, the receptor 500 comprises a cavity 510 for receiving the extension 450 of the conductive part 400. According to some embodiments of the present invention, the cavity of the receptor is an opening of the receptor that is slightly larger than the dimension of the extension of the conductive part in order to form a drainage channel (see below). The term "slightly larger" refers to a range of between 5 mm and 20 mm, typically to a range of between 5 mm and 10 mm. The corners of the opening may be shaped roundly. This is due to the fact that the opening may be milled during manufacturing. According to other embodiments, the size of the receptor opening matches exactly the size of the conductive part extension for a perfect fit thereof. Typically, the receptor's outer geometry is identical to the geometry of the rotor blade at its tip. The receptor forms the rotor blade tip. In other words, the receptor forms a prolongation of the rotor blade body. In typical embodiments, the receptor is attached to the rotor blade body with positive locking. Typically, there is no space between the receptor and the rotor blade body tip after mounting the receptor to the outer blade.

In many embodiments of the present invention, the cavity 510 has only one opening positioned at the rotor blade body oriented side 530 of the receptor. However, it is also possible that the cavity is in the form of a lead-through that leads from the rotor blade body oriented side of the receptor to the opposite side 700 of the receptor. Typically, the width of the cavity 510 is between 30 mm and 90 mm, e.g. 60 mm, whereas the height of the cavity is between 4 mm and 9 mm such as 6.5 mm. Further, the receptor 500 as shown in FIG. 5 comprises two holes 520. It shall be noted that the term "hole" is used synonymously to the terms "drilling", "bore" or "cavity" within this application. When mounting the receptor to the extension of the conductive part, the extension is entered into the cavity 510. In a subsequent step, fixing means such as screws, bolts, pins or the like are entered into the hole 520 and will be received by the holes 403 in the conductive part where they are fastened to. Thereby, the receptor is easily and removably fixed to the rotor blade.

Figure 6A:
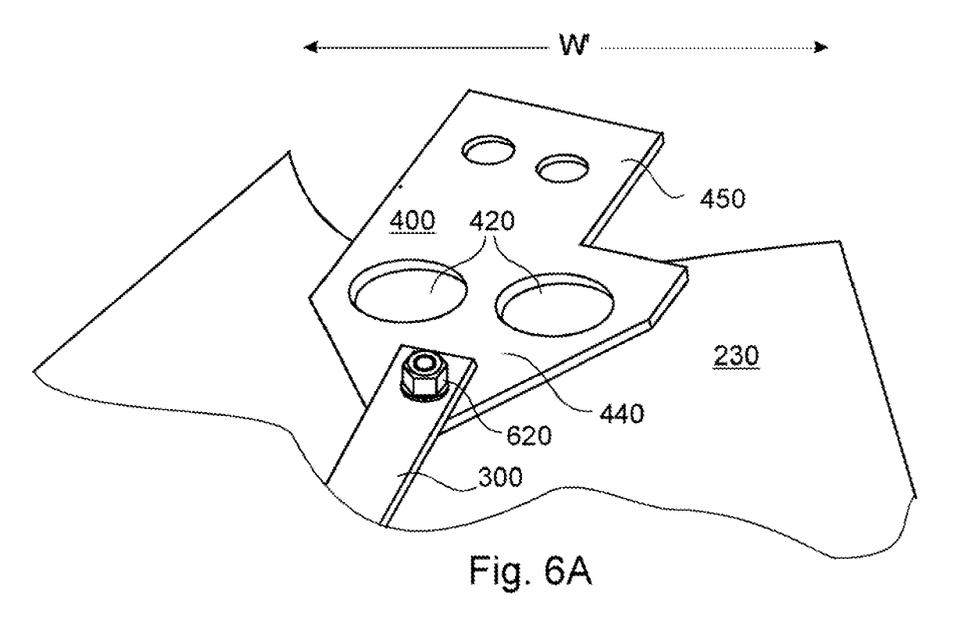
FIG. 6A shows one side of a rotor blade with a conductive part and a down conductor according to the present invention.

FIG. 6A shows the conductive part 400 mounted within the rotor blade body cavity and attached to the down conductor 300 by fixing means 620. The extension 450 still protrudes out of the rotor blade body when the suction side shell 220 is put over the pressure side shell 230 thereby shaping the rotor blade. After this step, the down conductor 300 and the conductive part body 440 are embedded within the rotor blade.

After manufacturing the pressure side shell 230 of the rotor blade body, the conductive part according to the present invention is attached thereto. Typically, the attachment is undertaken by gluing the conductive part to the rotor blade shell with the help of known adhesives or the like. In various embodiments of the present invention, the conductive part is attached approximately in the middle of the rotor blade body along its width W', whereas it is typically attached at the very tip of the rotor blade body along the rotor blade's longitudinal axis. The conductive part could also be mounted to the suction side shell. A down conductor 300 is then attached to the conductive part. This can be done by use of screws, bolts, pins or the like. The down conductor may have an arbitrary shape as long as it is capable of conducting the electric charge from a lightning strike down to the hub. At the other side of the conductive part, i.e. the extension, the conductive part 400 is connected to the receptor 500. The extension is entered into the cavity 510 and fixed thereto by the use of, for instance, screws or the like. These are fastened to the holes 520 and 430 in the extension of the conductive part. It is typical of the present invention that the receptor is fixed to the extension only from one side of the receptor. This is shown in FIGS. 6A und 6B where the screws are fastened to the extension from the lower side of the receptor that is covered by the receptor drawing in FIGS. 6A and 6B. Typically, the receptor is attached to the extension such that there is still a space between the walls of the cavity 510 and extension 450. This space forms a drainage channel 600 that provides the rotor blade with an opening for condensation water. The drainage channel leads through the complete receptor to the tip side 700. Therefore, in typical embodiments of the present invention, the receptor 500 has a drilling 710 at its tip side 700 constituting the drainage channel as shown in FIG. 7.

Figure 6B:
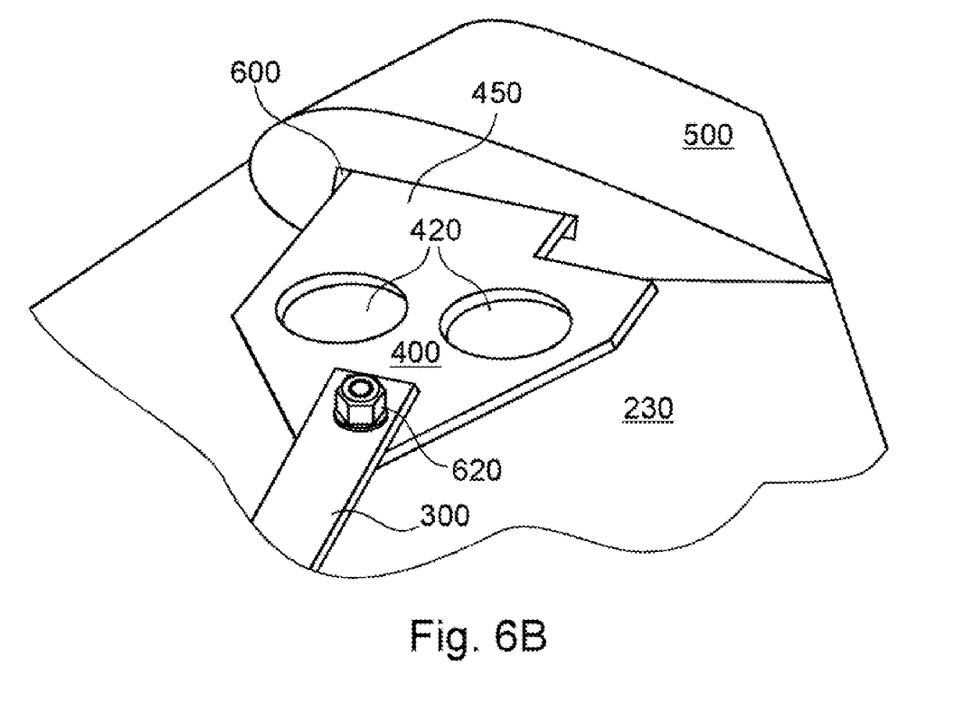
FIG. 6B shows one side of a rotor blade with a conductive part, a down conductor, and a receptor according to the present invention.

FIG. 6B shows the receptor 500 mounted to the conductive part. In this view, the extension of the conductive part is not visible as it is inside the receptor. The receptor is mounted to the extension of the conductive part via the screws 720 which are inserted into the drillings 520 and fixed thereto. In the perspective shown in FIG. 6B, the screws are inserted from the lower side into the receptor and the extension of the conductive part. Hence, they are not visible in FIG. 6B. Typically, one or two fixing means such as screws are sufficient for fixing the receptor to the rotor blade. The receptor attracts the lightning from all sides around the blade tip. In comparison to the state of the art, there is no extra connection necessary for contacting the suction side receptor, which is mounted to the suction side shell, with the pressure side receptor, which is mounted to the pressure side shell. During the production of the rotor blade, no reaching-in between the two shells before closing and gluing them together is necessary. Further, after a lightning strikes and possibly damages the receptor, the receptor can easily be replaced.

Figure 7:
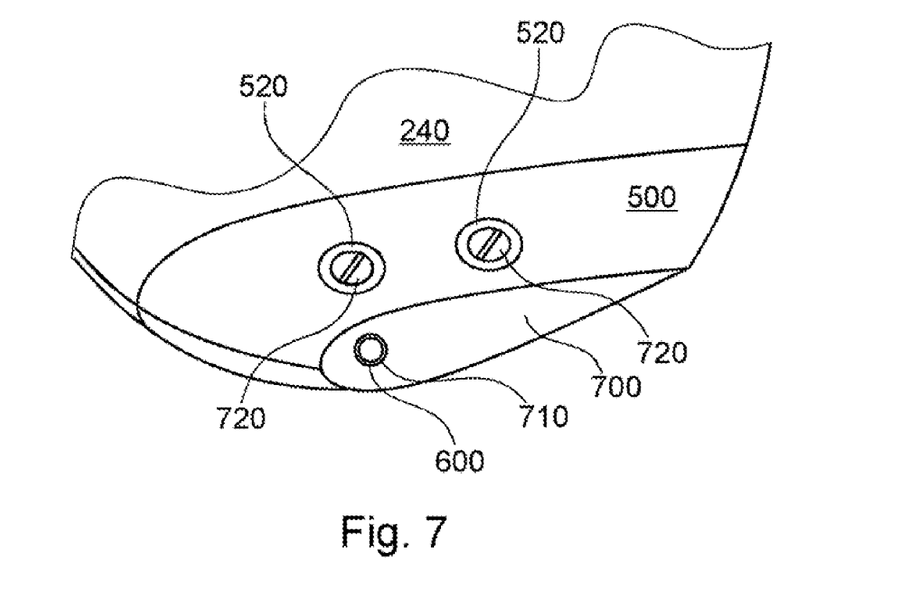
FIG. 7 is a schematic view of a rotor blade tip with a receptor attached to the conductive part according to the present invention.

FIG. 7 shows an embodiment of the present invention where the receptor is fixed to the rotor blade body 240. In order to mount the receptor, the receptor 500 is put over the extension of the conductive part until it touches the rotor blade body tip. In this position, screws or the like are inserted into the drillings 520 and fastened to the conductive part. The drillings 520 may have an upper portion with a wider hole diameter in order to receive the screw heads. Thereby, the screw heads do not protrude out of the receptor which could lead to unwanted noise. Further, FIG. 7 shows the drainage channel 600 which provides an opening 710 at the receptor's tip side 700. Condensation water inside the rotor blade can exit the rotor blade via the drainage channel 600.

Figure 8:
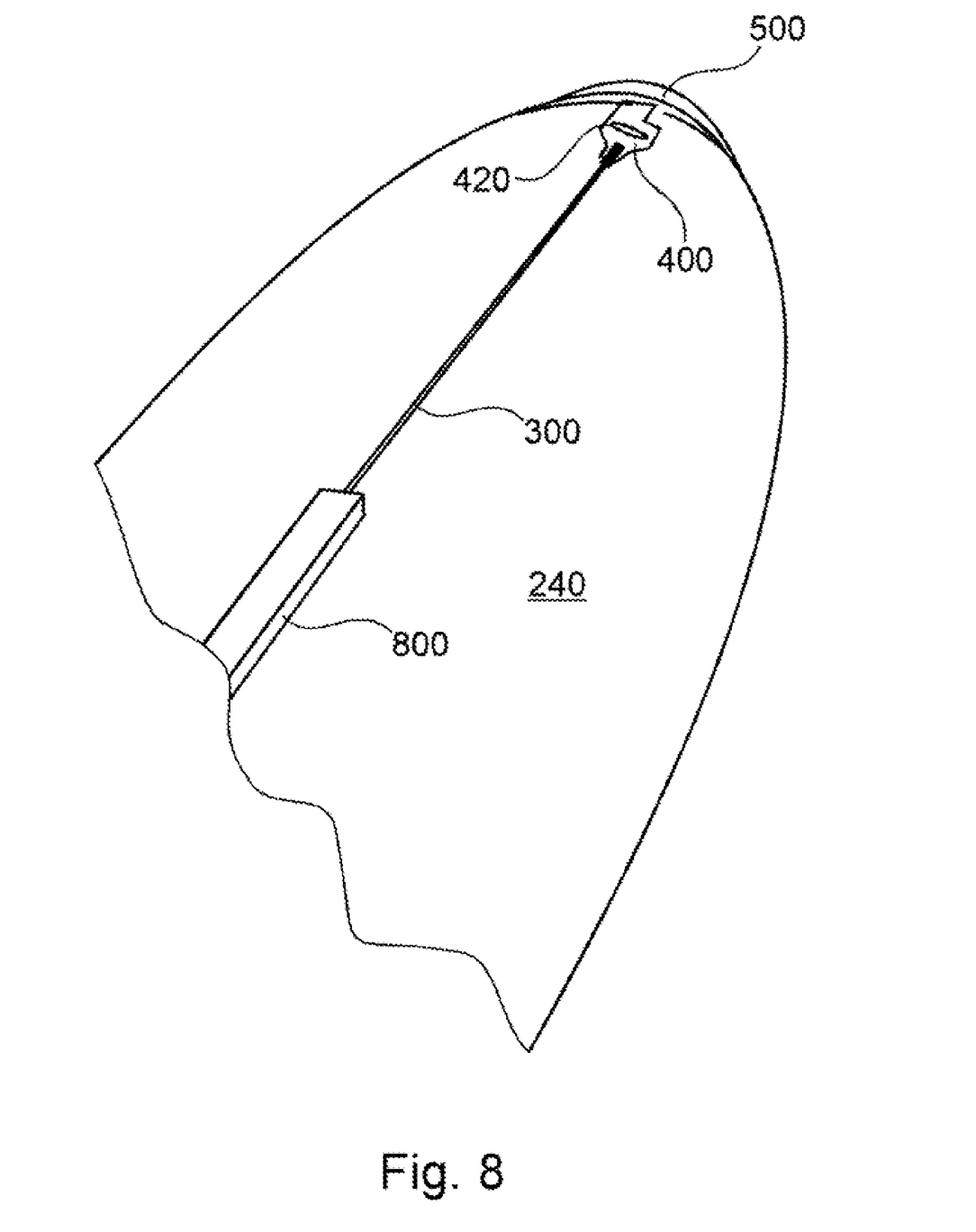
FIG. 8 is an open view of a rotor blade according to the present invention.

FIG. 8 is a schematic view of a rotor blade 140 suction side shell with the conductive part 400 and the down conductor 300 attached thereto. Further, the receptor 500 is already fixed to the conductive part 400. The down conductor leads through the rotor blade body to the rotor blade root. It may be arranged at or close to a stability unit such as a rib 800. This rib reduces the torsion of the rotor blade. The down conductor may have further contacts with lightning receptors arranged along the rotor blade.

Figure 9A:
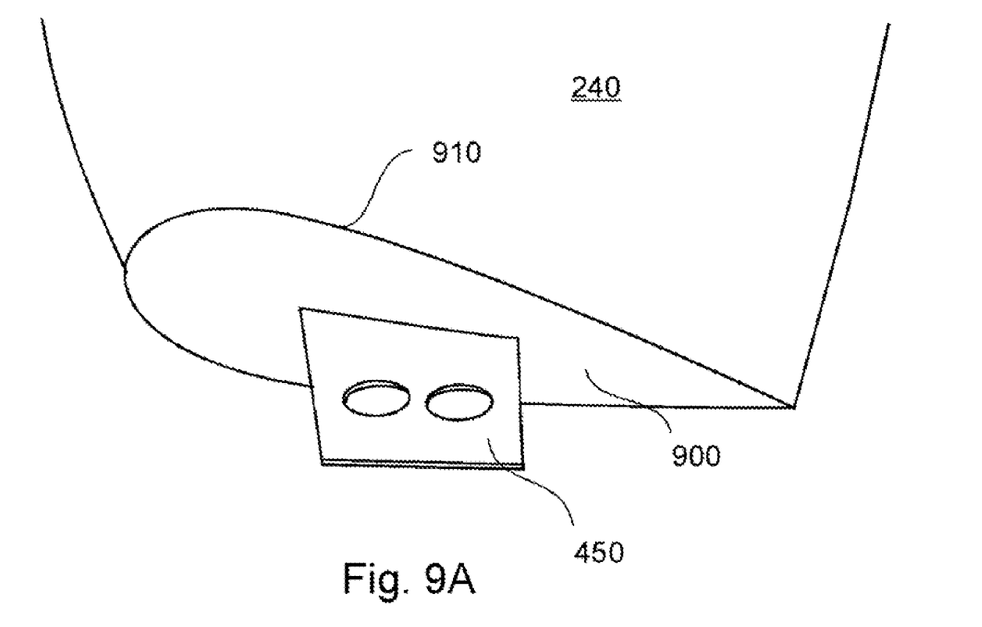
FIGS. 9A and 9B show two different embodiments of the conductive part according to the present invention protruding out of the rotor blade.
Figure 9B:
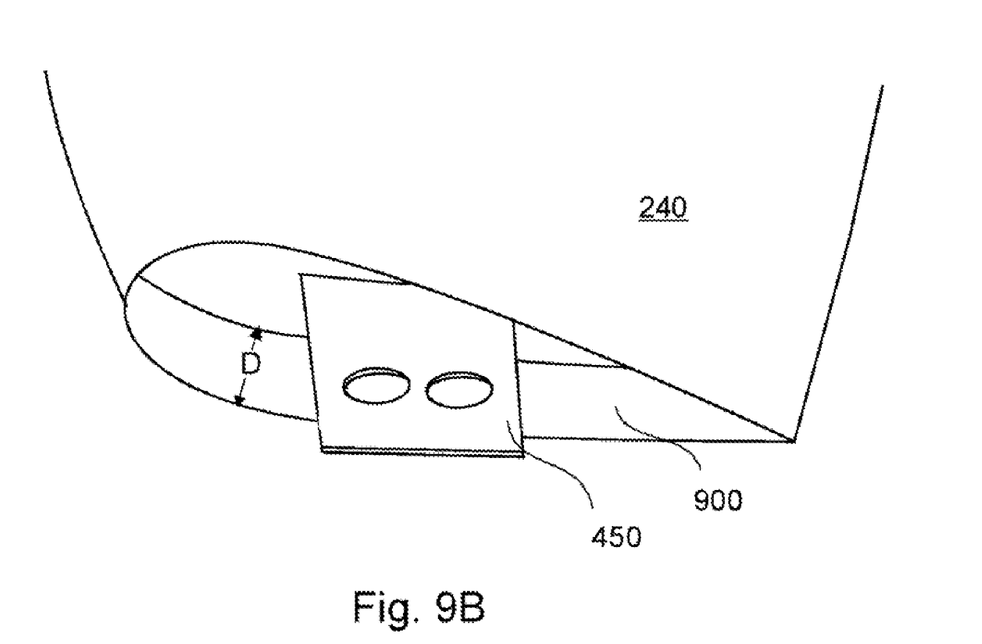

The conductive part of the present invention is arranged such that it protrudes out of the rotor blade body. The part that protrudes out of the rotor blade is called the "extension" of the conductive part. The extension will be encased by the receptor once the receptor is mounted. The meaning of "the extension protrudes out of the rotor blade body" is therefore to be understood such that the extension allows for the reception of the receptor. This does include the possibility that the extension protrudes out of the rotor blade body into a cavity that is still surrounded by the rotor blade shells. This shall be explained with respect to the embodiments shown in FIGS. 9A and 9B. In the embodiment of FIG. 9A, the extension starts in a plane 900 that defines the end of the rotor blade body and is formed between the ends 910 of the suction side shell and the pressure side shell. Thereto in contrast, in the embodiment shown in FIG. 9B, the extension 450 protrudes out of the rotor blade body at a depth D before the plane 900. That is, depending on the embodiment of the receptor used, the receptor fixed to the extension of the embodiment of FIG. 9B will be partly be surrounded by the rotor blade shells.

Due to its shape and fixing method of the receptor, it can easily be mounted to the extension of the conductive part. As both the receptor and the conductive part are made of conductive material, there is no need for attaching extra down conducting means. This in turn allows the easy attachment of a receptor to the rotor blade. Further, as the receptor is typically made of solid metal, it is not destroyed after every lightning strike. Many receptors known in the art are destroyed or at least substantially deformed after a lightning strike which leads to undesired noise effects. Therefore, they have to be replaced frequently. Generally, the receptor of the present invention can cope with a multitude of lightning strikes before it has to be replaced. Replacing the destroyed receptor and mounting a new receptor to the extension can be undertaken easily without laboriously connecting the receptor to down conducting means. Typically, the receptor of the present invention weighs between 0.1 kg and 0.5 kg, more typically between 0.2 kg and 0.3 kg so that the total torque of the blade is not substantially increased by the receptor. In typical embodiments, the weight of the conductive part is between 0.05 kg and 0.2 kg, typically 0.09 kg. This also does not substantially increase the total torque of the rotor blade.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotor blade for use in a wind energy system, comprising:
    a rotor blade body comprising a tip;
    a down conductor extending along the rotor blade body;
    a conductive part comprising a conductive part body attached to the rotor blade body and connected to the down conductor, and an extension extending outward from the conductive part body and protruding out of the tip;
    a lightning receptor having a cavity for slidably receiving the extension, and a drainage channel positioned next to the extension; and
    a fastener removably fastening the lightning receptor to the extension.

2. The rotor blade of claim 1, wherein the lightning receptor is structurally coupled to the rotor blade body by the extension only.

3. The rotor blade of claim 1, wherein the conductive part is positioned in the middle of the rotor blade body in the direction of a width of the rotor blade.

4. The rotor blade of claim 1, wherein the drainage channel is formed at least in part by a space between the extension and a wall defining the cavity.

5. The rotor blade of claim 1, wherein the lightning receptor comprises a drilling forming at least part of the drainage channel.

6. The rotor blade of claim 2, wherein the lightning receptor is electrically coupled to the down conductor by the extension.

7. The rotor blade of claim 1, wherein the extension has a drilling and the lightning receptor has a corresponding hole for receiving the fastener.

8. The rotor blade of claim 1, wherein the conductive part body has at least one hole, and the rotor blade further comprises a fixation filling disposed in the at least one hole for attaching the conductive part body to the rotor blade body.

9. The rotor blade of claim 1, wherein the lightning receptor is made of a solid metal.

10. The rotor blade of claim 1, wherein the shape of the lightning receptor corresponds to a prolongation of the shape of the rotor blade body.

11. A wind energy system with at least one rotor blade, the at least one rotor blade comprising:
    a rotor blade body comprising a tip;
    a down conductor extending along the rotor blade body;
    a conductive part comprising a conductive part body attached to the rotor blade body and connected to the down conductor, and an extension extending outward from the conductive part body and protruding out of the tip;
    a lightning receptor having a cavity for slidably receiving the extension, and a drainage channel positioned next to the extension; and
    a fastener removably fastening the lightning receptor to the extension.

12. The wind energy system of claim 11, wherein the lightning receptor is structurally connected to the rotor blade body by the extension only.

13. The wind energy system of claim 11, wherein the at least one rotor blade comprises three rotor blades.

14. The wind energy system of claim 11, wherein the drainage channel is formed at least in part by a space between the extension and a wall defining the cavity.

15. The wind energy system of claim 11, wherein the lightning receptor comprises a drilling forming at least part of the drainage channel.

* * * * *

UNITED STATES PATENT AND TRADEMARK OFFICE
CERTIFICATE OF CORRECTION

PATENT NO. : 7,766,620 B2
APPLICATION NO. : 11/672534
DATED : August 3, 2010
INVENTOR(S) : Stam et al.

It is certified that error appears in the above-identified patent and that said Letters Patent is hereby corrected as shown below:

On the Title Page, item (73), under "Assignee", in Column 1, Line 1,
delete "Electricc" and insert -- Electric --, therefor.

Signed and Sealed this

Thirtieth Day of November, 2010

David J. Kappos
*Director of the United States Patent and Trademark Office*